(12) United States Patent
Martin et al.

(10) Patent No.: US 11,775,929 B2
(45) Date of Patent: *Oct. 3, 2023

(54) SYSTEMS AND METHODS FOR IMPROVING RECOMMENDATION SYSTEMS

(71) Applicant: Stitch Fix, Inc., San Francisco, CA (US)

(72) Inventors: Jason B. Martin, Lafayette, CA (US); Katherine A. Livins, San Francisco, CA (US); Bradley J. Klingenberg, San Mateo, CA (US); Tarek Rached, Berkeley, CA (US)

(73) Assignee: Stitch Fix, Inc., San Francisco, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/388,332

(22) Filed: Jul. 29, 2021

(65) Prior Publication Data

US 2022/0129834 A1    Apr. 28, 2022

Related U.S. Application Data

(63) Continuation of application No. 15/241,899, filed on Aug. 19, 2016, now Pat. No. 11,113,659.

(51) Int. Cl.
*G06F 17/00* (2019.01)
*G06Q 10/087* (2023.01)
*G06N 20/00* (2019.01)
*G06F 16/332* (2019.01)

(52) U.S. Cl.
CPC ....... *G06Q 10/087* (2013.01); *G06F 16/3326* (2019.01); *G06N 20/00* (2019.01)

(58) Field of Classification Search
CPC ... G06Q 10/087; G06N 20/00; G06F 16/3326
See application file for complete search history.

(56) References Cited

U.S. PATENT DOCUMENTS

| | | | |
|---|---|---|---|
| 7,089,216 B2 * | 8/2006 | Van Overveld | G06Q 30/02 706/14 |
| 8,577,896 B2 * | 11/2013 | Sanders | G06F 16/9535 707/758 |

(Continued)

*Primary Examiner* — Talia F Crawley
(74) *Attorney, Agent, or Firm* — Van Pelt, Yi & James LLP

(57) ABSTRACT

Data about clients, items included in an item inventory, executable code for recommendation processes, and executable code for feature selection process(es), are stored. The recommendation processes are used to identify items in the item inventory that are recommended for specific clients, and the feature selection process(es) is/are used to select features that are displayed to entities tasked with selecting items from the item inventory for clients. Selection feedback and client feedback are received. One or more feature selection process(es) is/are modified based on the selection feedback and/or the client feedback, to thereby change which, where or/or how certain portion of the data about clients is displayed to the entities tasked with selecting items from the item inventory for the clients, and/or change which, where and/or how certain portion of the data about items is displayed to the entities tasked with selecting items from the item inventory for the clients.

20 Claims, 4 Drawing Sheets

(56) References Cited

U.S. PATENT DOCUMENTS

| | | | |
|---|---|---|---|
| 2002/0045959 A1* | 4/2002 | Van Overveld | G06Q 30/02 700/90 |
| 2003/0130904 A1* | 7/2003 | Katz | G06Q 20/20 705/26.41 |
| 2008/0243632 A1 | 10/2008 | Kane, Jr. | |
| 2010/0191582 A1* | 7/2010 | Dicker | G06Q 30/0631 705/26.1 |
| 2010/0250336 A1* | 9/2010 | Selinger | G06Q 30/0643 705/26.7 |
| 2013/0124361 A1* | 5/2013 | Bryson | G06Q 30/0631 705/26.7 |
| 2014/0101192 A1* | 4/2014 | Sabah | G06F 16/435 707/769 |
| 2014/0344102 A1* | 11/2014 | Cooper | G06Q 30/0631 705/26.7 |
| 2016/0292769 A1* | 10/2016 | Colson | G06N 20/00 |

* cited by examiner

FIG. 2

| Tops | Bottoms | Dresses | Jewelry | Browse |
|---|---|---|---|---|
| Great for TX | | | | |
| Great for Tall | | | | |
| Great for Busty | | | | |
| Great for Glam | | | | |
| Clients that bought the Collina also bought... | | | | |
| Tried & True | | | | |

Susan Harlow, 44
Dallas, TX

5'9"    165lb

Bra   Top   Dress   Pant
36D   XL      10      12

Style
Casual: 2
Edgy: 3
Boho: 2
Classic: 2
Glam: 4
Preppy: 1
Romantic: 2

Spendines
Tops:              0-50
2nd Layer:   150-200
Bottoms:     100-150
Dresses:     100-150
Accessory:     0-50
Jewelry:          0-50

Fix History
Collina: Love
Alania: Like
Corinna: Like

SYSTEMS AND METHODS FOR IMPROVING RECOMMENDATION SYSTEMS

CROSS REFERENCE TO OTHER APPLICATIONS

This application is a continuation of U.S. patent application Ser. No. 15/241,899 entitled SYSTEMS AND METHODS FOR IMPROVING RECOMMENDATION SYSTEMS filed Aug. 19, 2016 which is incorporated herein by reference for all purposes.

BACKGROUND

Recommendations systems are becoming increasingly common in online sales and digital media sites. Such systems typically use information about a user's preferences and purchasing behavior to recommend content and/or goods in which the user may be interested. Such recommendations systems often present a user with recommended content and/or goods without the user having to explicitly request or look for the content and/or goods. In this way, content and/or goods of which the user may have been unaware, may be brought to the attention of the user, for purchase. However, existing recommendation systems often recommend certain content and/or goods that are inappropriate for and/or poorly matched to users. Accordingly, there is a need to improve upon existing recommendation systems.

Where a recommendation system uses one or more processors to assist with selecting items for clients from a large item inventory, there is a huge amount of data about the clients and items within the item inventory that can be presented. If all of that data were to be presented, an entity tasked with making the final decision as to what items should be selected for a client would be so overwhelmed with data that the overall performance of the recommendation system would be very poor. In other words, there is a big data problem related to the visualization of big data including client data and item inventory data.

SUMMARY

In accordance with an embodiment of the present technology, a system includes one or more processors, one or more data stores, and a feedback interface. The one or more data stores, e.g., databases, are adapted to store client attribute data and client history data, for each of a plurality of clients, and item attribute data, for each of a plurality of items included in an item inventory. Additionally, the data store(s) are adapted to store executable code for each of a plurality of different recommendation processes, wherein each of the different recommendation processes may utilize the client attribute data, the client history data and/or the item attribute data in a different manner than the other recommendation processes. Also, the data store(s) are adapted to store the executable code for one or more feature selection process(es). The executable code for the plurality of different recommendation are each executable by the processor(s) to identify, for any particular one of the clients, a subset of the items in the item inventory that is recommended for the particular one of the clients. The executable code for the one or more feature selection process(es) is/are executable by the processor(s) to select which item attributes and which client attributes are to be presented to entities the may be tasked with selecting items for the clients from the item inventory.

The processor(s) is/are also adapted to, for each client of two or more of the clients, execute the executable code for two or more of the plurality of recommendation processes to thereby identify a plurality of different subsets of the items in the item inventory that are recommended for the client. The processor(s) is/are also adapted to execute the executable code for at least one of the feature selection process(es) to thereby select features for presentation, to one of the entities that is tasked with selecting items from the item inventory for the client. In accordance with specific embodiments, the selected features include information about two or more item attributes associated with items includes in two or more of the different subsets of the items in the inventory that are identified as a result of the executable code for two or more of the recommendation processes being executed, and information about two or more of the client attributes associated with the client.

The feedback interface is adapted to receive, for each client of two or more of the clients, indications of specific ones of the items that are selected from the item inventory for the client by the one of the entities that is tasked with selecting items from the item inventory for the client, and client feedback data about one or more of the items selected from the item inventory for the client by the one of the entities that is tasked with selecting items from the item inventory for the client. The feedback interface is also adapted to update the stored client history data based the client feedback data.

In accordance with certain embodiments, at least one of the feature selection process(es), that is/are used by the one or more processors to select features for presentation, is modified based on the updated stored client history data, to thereby improve performance of the system. The modifying of the feature selection process, based on the updated client history information, can, for example, result in modifying the information about item attributes and/or client attributes that are selected for presentation being modified to thereby improve performance of the system.

In accordance with specific embodiments, the system is adapted to systematically change which features are selected by the features selection process for presentation at different instances that features are selected for presentation. Additionally, the feedback system is adapted to identify which of the features when presented result in the items being selected by the entities for the clients receiving positive client feedback, and which of the features when presented result in the items being selected by the entities for the clients receiving negative client feedback. Based thereon, the feature selection process can be modified so that the features that are identified as resulting in positive client feedback are thereafter selected for presentation or are more prominently presented, and the features that are identified as resulting in negative client feedback are thereafter not selected for presentation or are less prominently presented.

In accordance with certain embodiments, the processor(s) are also adapted to access the client history data to produce training tasks for the entities that may be tasked with selecting items for the clients from the item inventory. In such embodiments, the system can include a training interface that is adapted to present at least some of the training tasks to at least some of the entities that may be tasked with selecting items for the clients from the item inventory, and provide training feedback to the entities that are presented with the training tasks. The training feedback can provide indications, which are based on the client history data, regarding whether particular ones of the clients, for which the entities selected items from the item inventory in response to the training tasks, had provided positive or negative feedback regarding the items.

The embodiments described herein can beneficially be used to analyze big data related to clients and item inventory, and select which subsets of data should be presented to provide for good overall system performance. Such embodiments also utilize feedback to improve the overall system performance over time. In such manners, embodiments of the present technology address and at least partially overcome big data problems related to the visualization of big data (including client data and item inventory data) by a recommendation system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 illustrates an example of the information that can be displayed to an entity tasked with selecting items from an item inventory for a client.

DETAILED DESCRIPTION

Figure 1:
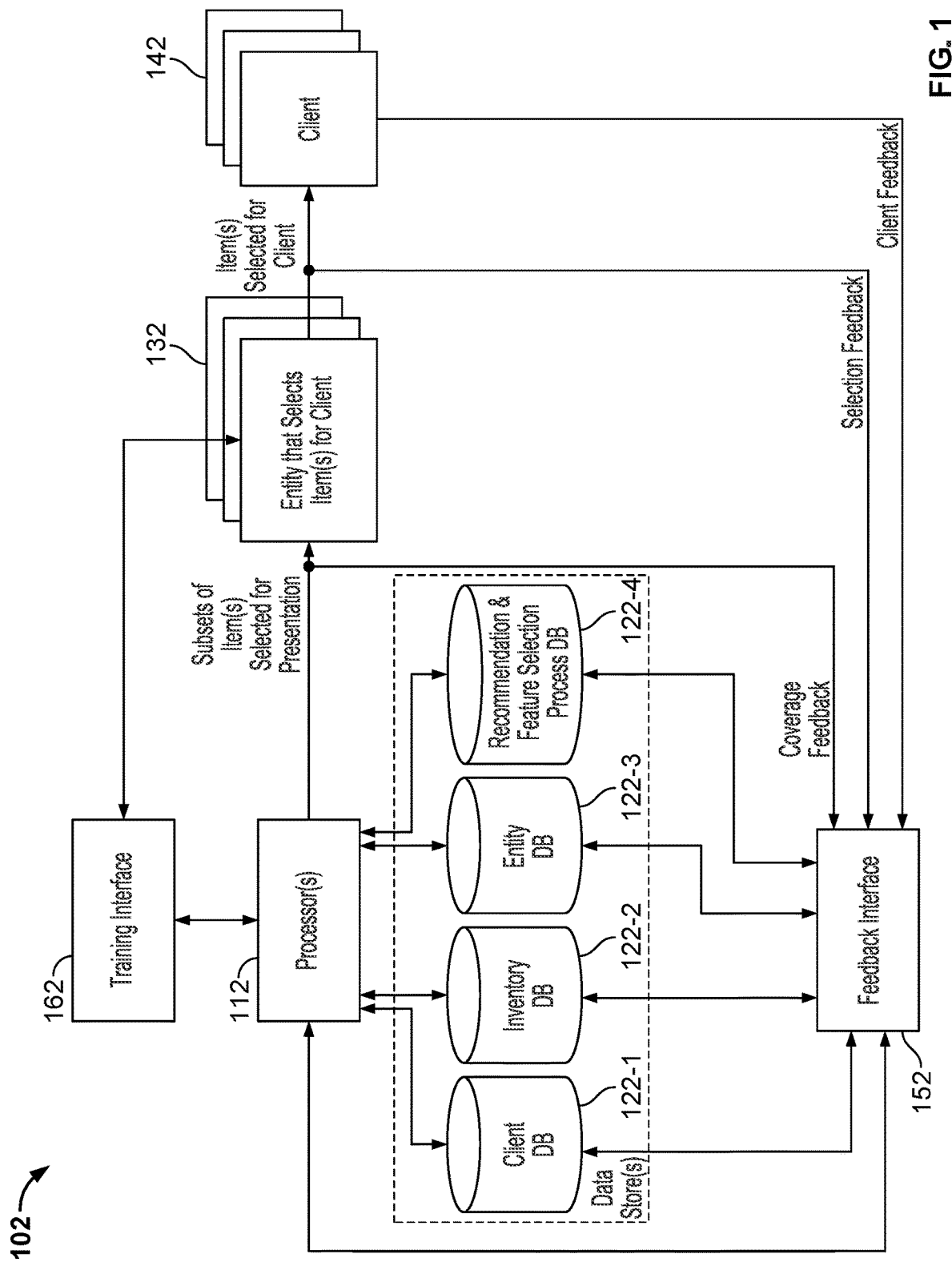
FIG. 1 illustrates a system that provides recommendations to entities that select items for clients from an item inventory.

As noted above, where a recommendation system uses one or more processors to assist with selecting items for clients from a large item inventory, there is a huge amount of data about the clients and items within the item inventory that can be presented. If all of that data were to be presented, an entity tasked with making the final decision as to what items should be selected for a client would be so overwhelmed with data that the overall performance of the recommendation system would be very poor. In other words, there is a big data problem related to the visualization of big data including client data and item inventory data, as noted above.

Embodiments of the present technology intelligently, and in some instances systematically, analyze big data related to clients and item inventory, and select which subsets of data should be presented to provide for good overall system performance. Embodiments of the present technology also utilize feedback to improve the overall system performance over time. In other words, embodiments of the present technology address and at least partially overcome the above summarized big data problem related to the visualization of big data including client data and item inventory data.

In the following detailed description, reference is made to the accompanying drawings that form a part hereof, and in which is shown by way of illustration specific illustrative embodiments. It is to be understood that other embodiments may be utilized and that logical, functional, mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

Most existing recommendation systems are computer implemented, and once implemented, rely entirely on computer implemented processes to provide recommendations to users. However, while computers are excellent at analyzing structured data, computers are generally not very good at analyzing unstructured data. Further, while computers are excellent at implementing the processes that they are programmed to implement, computers are not very good at parsing through the results of multiple processes or appreciating that some processes provide better results than others for specific users. Additionally, recommendation systems typically provide recommendations directly to the people, also referred to as consumers or clients, that determine whether or not they would like to purchase the recommended content and/or goods, wherein such content and/or goods can more generally be referred to individually as an item or collectively as items. Embodiments of the present technology, which are described below, provide improvements over such existing recommendation systems.

FIG. 1 illustrates a system 102 that provides recommendations to entities that select items for clients from an item inventory, rather than providing the recommendations directly to the clients that determine whether or not they would like to accept (e.g., purchase) the recommended items. The system 102 (which can also be referred to as a recommendation system 102) is especially useful for assisting with tasks that are best performed by a combination of machines (e.g., computers) and humans. More specifically, the system 102 is especially useful for taking advantage of the fact that computers are typically better equipped to analyze or otherwise handle structured data, while humans are typically better equipped to analyze or otherwise handle unstructured data. Explained another way, the system 102 provides a mechanism to combine machine-learning processes with expert-human judgment, as will be appreciated from the description below.

Referring to FIG. 1, the system 102 is shown as including one or more processor(s) 112 that is/are communicatively coupled to a client database 122-1, an inventory database 122-2, an entity database 122-3, and a recommendation and feature selection process database 122-4. The databases 122-1, 122-2, 122-3 and 122-4 can be individually referenced as a database 122, or collectively referenced as databases 122. More generally, the databases 122 are examples of types of data stores. Alternative types of data stores can be used instead or, or in addition to the databases 122, to store the types of data described herein. Also shown in FIG. 1 are blocks 132, which represent entities that select one or more items for clients, and blocks 142, which represent the clients for which the item(s) is/are selected. Such entities 132 can be people that have an expertise related to the items included in the item inventory. FIG. 1 also shows a feedback interface 152 that accepts various types of feedback, including client feedback, selection feedback and coverage feedback, each of which is discussed in additional detail below. The feedback interface 152 is shown as being communicatively coupled to the databases 122. As will be described in additional detail below, in accordance with certain embodiments, data stored within the various databases 122 can be updated based on the various types of feedback received by the feedback interface 152.

In accordance with an embodiment, the client database 122-1 is adapted to store client attribute data and client history data, for each of a plurality of clients 142. Clients can be, e.g., people that have requested that items be selected for them and provided (e.g., mailed, shipped, sent, transmitted or otherwise provided) to them. The inventory database 122-2 (which can also be referred to as an item database) is adapted to store item attribute data, for each of a plurality of items included in an item inventory. The entity database 122-3 is adapted to store entity attribute data, for each of the entities 132 that may be tasked with selecting items from the item inventory for one or more of the clients 142. As will be described in additional detail below, in accordance with certain embodiments, the entity attribute data, which is stored in the entity database 122-3 for each entity of at least some of the entities 132, includes training history data indicative of one or more types of training provided to the entity and/or efficacy of the training provided to the entity.

Still referring to FIG. 1, the recommendation and feature selection process database 122-4 is adapted to store executable code for each of a plurality of different recommendation processes that are each executable by one or more of the processor(s) 112 to identify, for any particular one of the clients 142, a subset of the items in the item inventory that is recommended for the particular one of the clients 112. The recommendation and feature selection process database 122-4 is also adapted to store executable code for one or more feature selection process(es) that is/are executable by one or more of the processor(s) 112 to select which item attributes and which client attributes are to be presented to entities (e.g., 132) the may be tasked with selecting items for one or more of the clients 142 from the item inventory. In accordance with certain embodiments of the present technology, the processor(s) 112 can use the recommendation processes and feature selection process(es) stored in the database 122-4 to identify items from the item inventory to recommend for clients. More specifically, the processor(s) 112 can be adapted to execute the executable code for two or more of the plurality of recommendation processes stored in the database 122-4 to thereby identify a plurality of different subsets of the items in the item inventory that are recommended for a client. Further, the processor(s) 112 can be adapted to execute the executable code for at least one of the feature selection process(es) to thereby select features for presentation, to one of the entities that is tasked with selecting items from the item inventory for the client. In accordance with certain embodiments, the selected features can include information about two or more item attributes associated with items includes in two or more of the plurality of different subsets of the items in the inventory that are identified as a result of the executable code for two or more of the plurality of recommendation processes being executed, as well as information about two or more of the client attributes associated with the client for which items are being selected. In other words, two or more recommendation processes and one or more feature selection process(es) are used select which items, item attributes and client attributes are displayed to an entity tasked with selected items for a client, as well as where and/or how such attributes are displayed.

The items in the item inventory, for which item attribute data is stored in the inventory database 122-2, can be, for example, women's apparel, with each item in the item inventory corresponding to a different piece of women's apparel. For a more specific example, the items in the item inventory can include pants, skirts, dresses, shirts, sweaters, jackets, bracelets, necklaces, scarfs, hats and/or the like. The item attribute data stored in the inventory database 122-2 can include, for each of the items in the item inventory, a plurality of item attributes. Some of the item attributes can be objective attributes, while other attributes can be subjective attributes. Exemplary objective item attributes include: an item type (e.g., pant, skirt, dress, etc.), an item designer and/or brand, an item size, an item color, an item stock keeping unit (SKU) number, an item pattern (e.g., solid, checked, pinstripe, etc.), an item material (e.g., cotton, wool, synthetic, etc.), and/or the like. Exemplary subjective item attributes include: good for tall women, good for short women, good for busty women, good for women in the State of Texas, good for preppy women, good for women in their 20s, good for women in their 50s, good for women with a long torso, casual, dressy, good for tropical vacations, good for spring, good for winter, fits true to size, runs small, runs large, and/or the like. Subjective item attributes may also specify for which one or more body types (e.g., straight, pear, spoon, hourglass, top hourglass, inverted triangle, oval, diamond, etc.) an item is appropriate. At least some of the objective item attributes can be automatically entered into the inventory database 122-2, while other objective item attributes can be manually entered into the inventory database 122-2. In accordance with an embodiment, the subjective item attributes are specified by entities (e.g., people) that have an expertise in the type of items included in the inventory and are manually entered into the inventory database 122-2. The item inventory can also specify how many units of each item are presently in the item inventory. Additionally, the item inventory can specify how many units of each item have been ordered, as well as when ordered items are expected to be received to replenish the item inventory. Item attributes can also specify how often an item has been provided to clients, how often the item has been accepted (e.g., purchased) by clients and/or how often the item, once provided to clients, has been accepted (e.g., purchased) by clients. For clarification, not all item attributes are mutually exclusive. For example, an item may be both "good for tall" and "good for average height". These are just some examples of the types of item attributes that can be stored in the inventory database 122-2, which examples are not intended to be all encompassing. At least some of the item attributes, or more generally at least a portion of the stored item information, for each of the items in the item inventory, is initially at least partly based on inputs accepted from an entity that is tasked with specifying item attributes. For example, a web based user interface can be presented to an entity that enables them to enter objective and subjective information about items, e.g., in response to questions or the like.

The client attribute data stored in the client database 122-1 can include client attributes associated with each of a plurality of clients 142. Some of the client attributes can be objective attributes, while other attributes can be subjective attributes. Exemplary objective client attributes include: date of birth and/or age, height, weight, waist size, chest size, bra size, inseam length, torso length, shirt size, dress size, pant size, residential address, whether or not the client is a mother, occupation, and/or the like. Client attribute data may also include image data for a client, which enables a picture of the client to be displayed to an entity that is tasked with selecting items to provide to the client. Exemplary subjective client attributes include: preferred style (e.g., classic, preppy, casual, bohemian, etc.), preferred fit (e.g., loose, fitted, tight, etc.), preferred color scheme (e.g., bright, subdued), preferred colors (e.g., red, blue), disliked colors (e.g., teal, purple), preferred patterns (e.g., solids, stripes, floral), and/or the like. Subjective client attributes can also specify to what extent a client likes specific styles, such as, but not limited to, casual, edgy, bohemian, classic, glamorous, preppy, romantic, and/or the like. Subjective client attributes can be binary (e.g., no or yes, or 0 or 1), or can have greater levels of granularity (e.g., a number between 0 and 5, with 5 indicating the greatest preference). Subjective client attributes can also specify to what extent a client likes specific designers and/or brands. Subjective client attributes may also specify how much a client indicates they are willing to spend on specific types of items. Another exemplary client attribute is body type (e.g., straight, pear, spoon, hourglass, top hourglass, inverted triangle, oval, diamond, etc.). The client history data associated with a particular client can also specify how long the particular client has been a member of the recommendation service provided by the system 102, how often items have been shipped to the client, which items were purchased or otherwise accepted by the client, which items were returned or otherwise not accepted by the client, and/or the like, each of which are objective types of information. The client history data associated with a particular client may also specify how much a client has actually spent on specific types of items. These are just some examples of the types of client history data that can be stored in the client database 122-1, which examples are not intended to be all encompassing. In an embodiment, at least some of the client attributes, or more generally at least a portion of the stored client attribute data, for each of the clients, is initially at least partly based on inputs accepted from the client. For example, a web based user interface can be presented to a client that enables the client to enter objective and subjective information about themselves, e.g., in response to questions or the like.

In certain embodiments, the processor(s) 112 is/are adapted to identify a plurality of different subsets of the items in the item inventory that are recommended for any particular one of the clients by using all or some (i.e., each of two or more) of the plurality of different recommendation processes (for which executable code is stored in the database 122-4) to generate a different subset of the items in the inventory that is recommended for the particular one of the clients. Such identified subsets (or portions thereof) of the items in the inventory can be displayed to the specific entity 132 (e.g., a person) that is tasked with selecting items from the item inventory for the particular one of the clients. Accordingly, the processor(s) 112 can be used to parse through data about a relatively large group of items included in an item inventory, and narrow the relatively large group down to a relatively smaller group, and thereafter a person can use their expert human judgment to select items from the relatively smaller group to provide (e.g., mail, ship, send, transmit or otherwise provide) to a client.

Assume, for example, that a particular entity 132 is tasked with selecting five items to send to a particular client 142. Where the number of items included in an inventory is relatively large, and there is a relatively large number of different recommendation processes (for which executable code is stored in the database 122-4), the entity tasked with selecting items from the item inventory for one of the clients may be overwhelmed. For example, assume that there are ten thousand different items in the item inventory, and that there are one hundred different recommendation processes for which executable code is stored in the database 122-4. Further, assume that each of the different subsets of the items (identified by the processor(s) 112, using one of the recommendation processes) includes six items. Each of the subsets of items need not be mutually exclusive, e.g., it is possible that two different subsets of items, identified using two different recommendation processes, may be the same, but that is highly unlikely. However, there is a greater likelihood that an individual item may be included in more than one of the different subsets of items. Continuing with this example, and assuming that every one of the one hundred different recommendation processes is utilized by the processor(s) 112 to identify a subset of six recommended items, this would result in one hundred different subsets of six items being identified by the processor(s) 112. In other words, in this example, information about six hundred items may be displayed the entity 132 tasked with selecting items from the item inventory for one of the clients 142. While narrowing ten thousand items down to six hundred items may be helpful, it is still likely that the entity tasked with selecting items from the item inventory for one of the clients would be overwhelmed, or would at least ignore many of the suggested items. Certain embodiments described herein can be used to better assist the entity (tasked with selecting items from the item inventory for one of the clients) with making their selections for a client. More generally, embodiments of the present technology described herein can be used to provide improved techniques for managing, analyzing and presenting big data.

In accordance with an embodiment, each of the different recommendation processes for which executable code is included in the database 122-4 has a corresponding different theme. The themes associated with recommendation processes may or may not be related to specific client attributes. Exemplary themes that relate to specific client attributes include: good for tall women, good for short women, good for busty women, good for women in the state of Texas, good for preppy women, good for women in their 20s, good for women in their 50s, good for women with a long torso, casual selections, dressy selections, good for tropical vacations, good for spring, good for winter, good for women who like classic styles, good for women that like bohemian styles and/or the like. As can be appreciated from this exemplary list of themes, some of the themes (corresponding to recommendation processes) can be descriptors that are the same as or similar to descriptors of attributes associated with items in the item inventory. In accordance with an embodiment, for at least some of the themes, each theme (corresponding to a recommendation process) indicates a common attribute associated with items selected using the recommendation process. For example, the common attribute associated with items selected using the theme "good for tall women" is that all the items selected using the recommendation process having that theme are believed to be good for women that are at least 5 feet 8 inches. For another example, the common attribute associated with items selected using the theme "good for women in the State of Texas" is that all the items selected using the recommendation process having that theme are believed to be good for women that live in the State of Texas. Recommendation processes can be even more specific than those exemplary processes discussed above, or two or more recommendation processes can be compounded, e.g., to identify items that are "good for tall women in the State of Texas" or "good for preppy women in winter". As processes, or combinations of processes become more specific, there coverage and level of confidence will likely decrease, in which case heuristics can be used to control a minimum coverage and/or confidence threshold.

Other themes can be more general and not specifically related to client attributes. For example, further exemplary themes of recommendation processes include: best sellers; highest probability of being purchased; highest profit margin; most similar to previously purchased items; least similar to previously purchased items; best for casual events; best for business events; good for fitting in; good for standing out; and/or the like. These are just a few examples that are not intended to be all encompassing. The types of recommendation processes and the themes associated therewith can vary greatly, depending upon the types of items in an item inventory and the clients for which items are being selected. Preferably, new recommendation processes can be added to the recommendation process database 122-1 without affecting and/or requiring any specific coordination with the remaining portions of the system 102. This allows new processes to be tested and trained as desired, and poorly performing processes to be removed.

One or more recommendation processes can calculate a distance or similarity metric between specific attributes associated with a client and specific attributes associated with items in an item inventory, with each distance or similarity metric being assigned a weight. Different recommendation processes may focus on different attributes and/or may weight distance or similarity metrics differently than one another. Additionally, or alternatively, different recommendation processes can use different ways to calculate the distance or similarity metrics between specific attributes associated with a client and corresponding attributes associated with items in an item inventory.

In accordance with certain embodiments of the present technology, the processes stored in the database 122-4 (and more specifically, the processes whose executable code is stored in the database 122-4) are composable processes, which can be selected and assembled (i.e., combined) in various different combinations to satisfy various different objectives. The composability of the processes stored in the database 122-4 promotes reuse of the processes. A composable process, as the term is used herein, is a process that is both modular and stateless. Modular means that a process may cooperate with other processes (by using the output of another process as its input and/or providing its output as an input to another process) and that the process may be swapped out and replaced with another process. Stateless means that a process treats each call or invocation as an independent transaction, unrelated to previous calls or invocations. With composable processes, the result (i.e., output) of a process can be is passed as an argument of (i.e., an input to) a next process, and the result of the last process can be the result (i.e., output) of the whole.

In accordance with certain embodiments of the present technology, each of the composable processes that is stored in the database 122-4 is designated as (e.g., tagged as) either being executable using on-demand processing, or being executable using batch-processing. In accordance with certain embodiments of the present technology, each of the composable processes includes corresponding metadata and a corresponding computation function. The metadata for each of the composable processes that is designated as being executable using on-demand processing can include at least a name of the composable process, an author of the composable process and a pointer to the corresponding computation function. The metadata for each of the composable processes that is designated as being executable using batch-processing can include at least a name of the composable process, an author of the composable process and a pointer to a result of the composable process (which result can be stored as data in the batch-processing results data store, not shown). Each computation function can be a class, and all computation functions of composable processes that are designated as being executable using on-demand processing may inherit from a top level base class. In certain embodiments, each of the composable processes can be thought of as a directed graph or tree, which may include a root as well as some leaves.

In accordance with certain embodiments of the present technology, the format of the output of each of the composable processes is independent of whether the composable process is, was, or will be processed using on-demand or batch-processing. In other words, the outputs of all of the composable processes, whether they are designated as being executable using on-demand processing or batch-processing, should have the same format. Beneficially, with such embodiments, when a composable process is being developed, e.g., by a data scientist, the data scientist (which can also be referred to as an process developer) need not think about whether one or more other composable process(es) that the composable process being developed may invoke and/or be combined or composed with is/are designated for on-demand processing or batch-processing, because the structure of the output of each of the composable processes is independent of whether it is, was, or will be processed using on-demand or batch-processing.

In accordance with an embodiment, at least one of the feature selection process(es) may be used by the processor(s) 112 to determine, for each of the recommendation processes having a theme that indicates a common attribute associate with items selected using the recommendation process, whether or not any particular one of the clients satisfies the common attribute. Then, based on such determinations, the processor(s) 112 can eliminate from being displayed, to an entity 132 that is tasked with selecting items from the item inventory for the particular one of the clients 142, information about one or more of the subsets identified using any recommendation process having a theme that indicates a common attribute not satisfied by the particular one of the clients. For example, where a particular client is a women that is 5 feet 1 inches tall and lives in the State of Oregon, the processor(s) 112 can determine that the particular client does not satisfy the attributes "tall" and "living in the State of Texas". Accordingly, the processor(s) 112 can eliminate from being displayed, to an entity 132 that is tasked with selecting items from the item inventory for that particular client 142, information about a subset of items believed to be good for tall women, and information about a subset of items believed to be good for women living in the State of Texas. One way that the processor(s) 112 can do this is to not run the recommendation process having the theme "good for tall women", and not run the recommendation process having the theme "good for women living in the State of Texas". Alternatively, the processor(s) 112 can executed the executable code for the recommendation processes having the themes "good for tall women" and "good for women living in the State of Texas", but can ignore or hide the subsets of items identified using those processes, or rank or sort the subsets of items identified using those processes in such a manner that they will not be displayed. Other variations are also possible and within the scope of an embodiment.

In accordance with an embodiment, the processor(s) 112 is/are adapted to select for display, to an entity 132 that is tasked with selecting items from the item inventory for one of the clients 142, information about two or more of the plurality of different subsets of the items in the inventory that are identified by running all or some of the processes included in the database 122-4. In order to accomplish this task, the processor(s) 112 can calculate, for each of at least some of the subsets of items identified using recommendation processes, one or more metrics that quantify one or more aspects of the subset of items. Exemplary metrics that quantify aspects of a subset of items include, but are not limit to, a metric indicative of probability of successfully (for making a sale), a metric indicative of profit, a metric indicative of similarity to previous items accepted by the client, a metric indicative of dissimilarity to previous items accepted by the client, a metric indicative of a probability of client satisfaction, a metric indicative of a probability of client retention, a metric indicative of optimally utilizing a company's inventory, a metric indicative of a cost of fulfilling a client's shipment and/or the like. The processor(s) 112 can then use one or more processes sort at least some of the identified subsets of items, in dependence on at least one of the one or more calculated metrics, to produce a sorted subsets of items. The processor(s) 112 can then use one or more feature selection process(es) to select for display, from the sorted subsets of items, information (e.g., item attributes) about two or more of the identified subsets of the items in the inventory, as well as where and/or how such information is displayed, as will be described in additional detail below. The processor(s) 112 can also use one or more feature selection process(es) to select which client attributes are displayed to an entity 132 that is tasked with selecting items for a client, as well as where and/or how such client attributes are displayed, as will be described in additional detail below.

In accordance with an embodiment, the information about two or more of the identified subsets of the items in the inventory can be displayed via a communication interface (e.g., a web browser) to an entity (represented by block 132 in FIG. 1) that is tasked with selecting items from the item inventory for one of the clients. This eliminates the need for any of the entities (represented by blocks 132 in FIG. 1) to obtain custom software to enable them to review recommended subsets of items (produced by the processor(s) 112) in order to perform their job of selecting one or more items from the item inventory to be provided (e.g., mailed, shipped, sent, transmitted or otherwise provided) to a client. In other words, each entity 132 can utilize a communications interface (e.g., a web browser) and a communication network (e.g., the Internet, a LAN, a WAN, a wireless network, an intranet, a private network, a public network, a switched network, combinations of these, and/or the like) to view subsets of items that are recommended for a particular client. In an alternative embodiment, the entities (represented by blocks 132 in FIG. 1) may use customized software to enable them to review recommended subsets of items (produced by the processor(s) 112) in order to perform their job of selecting one or more items from the item inventory to be provided (e.g., mailed, shipped, sent, transmitted or otherwise provided) to a client.

More specifically, in accordance with certain embodiments, the processor(s) 112 can execute the executable code for at least one of the feature selection process(es) stored in the database 122-4 to thereby select features for presentation to one of the entities 132 that is tasked with selecting items from the item inventory for the client 142. The feature selection process(es), which can also be referred to as attribute selection process(es), may specify which client attributes for a client 142 are displayed on a screen to an entity 132 that is tasked with selecting items for the client 142, as well as where and/or how the client attributes for the client 142 are displayed on the screen. The feature selection process(es) may also specify which item attributes (for items identified for the client 142 by two or more recommendation processes) are displayed on a screen to the entity 132 that is tasked with selecting items for the client 142, as well as where and/or how the item attributes are displayed on the screen. With respect to "where" client or item attributes may be displayed on a screen, this can refer, e.g., to locations at which attributes are displayed, such as in the top left corner, the top right corner, the bottom left corner, the bottom right corner, the top center, the bottom center, along a left side, along a right side, in a specific column, in a specific row, etc. With respect to "how" client or item attributes may be displayed, this can refer, e.g., to the size of images that are displayed, the color and/or font size of text that is displayed, etc.

FIG. 2 will now be used to illustrate an example of the information that can be displayed to one of the entities 132 tasked with selecting items from the item inventory for one of the clients 142. For example, the information shown in FIG. 2 can be presented via a web page that is accessible via a web browser, but is not limited thereto. The specific information displayed in FIG. 2 and/or the location of the information displayed in FIG. 2 can be determined using at least one feature selection process, the executable code for which has been described as being stored in the database 122-4, but can be stored in another database, or more generally, in any data store.

Referring to FIG. 2, certain client attributes (which can also be referred to as client features) for a specific client are shown in the left most column 212, including: name, age, city and state of residence, bra size, top size, dress size and pant size. Other client attributes (which can also be referred to as client features) included in the left most column 212 are information specifying to what extent the client likes specific styles, information specifying how much the client is willing to spend on various types of items of apparel (which information can be referred to as spendiness), and historical information specifying to what extent the client has a preference for specific designers or brands. Another client attribute that may be displayed, but is not shown in FIG. 2, is a picture of the client. To the right of the left most column 212 are a number of rows 222-1, 222-2, 222-3, 222-4, 222-5 and 222-6, each of which can be referenced to as a row 222, and which collectively can be referenced as rows 222. Each of the rows 222 includes information about a different subset of items identified, by the processor(s) 112, using a different one of the recommendation processes included in the database 122-4. Such displayed information about items (which can also be referred to as item attributes or item features) can be textual and/or pictorial information. For example, in FIG. 2, each of the rows 222 includes thumbnails of six items in an identified subset of items. In an embodiment, additional pictures and/or other details about an item can be accessed by clicking on or otherwise selecting the thumbnail corresponding to the item. Each of the rows 222 is also shown as including the name of the theme of the recommendation process that was used to select the subset of items included in the row. For example, the theme associated with the row 222-1 is "great for TX", the theme associated with the row 222-2 is "great for tall", the theme associated with the row 222-3 is "great for busty", the theme associated with the row 222-4 is "great for glam" (where "glam" is short for glamourous), the theme associated with the row 222-5 indicates that clients that bought a particular brand (loved by this particular client) also bought . . . , and the theme associated with the row 222-6 is "tried & true". Also shown in FIG. 2 are buttons 232 that enable an entity to filter the displayed items, e.g., such that if the "tops" button was selected, only tops would be displayed or highlighted in the rows 222.

In accordance with an embodiment, the processor(s) 112 can use a row ordering type or aspect of a feature selection process to determine the order of the rows 222 shown in FIG. 2. Such a process can use metrics, examples of which were mentioned above, to order the rows 222. A further type or aspect of a feature selection process, such as a relevancy process, can be used to specify the order of the items in each row, e.g., so a most relevant item (of an identified subset of items) for a particular client is shown at the left most position in the row, and the least relevant item is shown at the right most position in the row. Other variations are also possible, and within the scope of the embodiments described herein.

In FIG. 2, items identified using the same recommendation process are displayed within a same row, i.e., each row corresponds results produced using a same one of the recommendation processes. Alternatively, items identified using the same recommendation process can be displayed within a same column, i.e., each column can correspond to one of the recommendation processes. More generally, inventory determined to be appropriate for a client can be divided into facets, with each facet representing a subset of items that is matched to zero, one or more specific client attributes.

Referring back to FIG. 1, information about which subsets of items and which attributes of the items are actually displayed to the entities 132 tasked with selecting items for clients 142 can be provided to the feedback interface 152, which information can be referred to as coverage feedback. Additional types of feedback that can be collected and utilized include where individual items were presented within a row or column, which rows or columns did the entity (tasked with selecting items for a client) select from, which rows or columns were ignored. Such feedback information can be used, e.g., to calibrate the qualification, selection and/or sales rate for each subset of items, and/or the items therein. Additionally, information about which items were selected by the entities 132 to provide to clients 142 can also be provided to the feedback interface 152, which information can be referred to as selection feedback. More specifically, selection feedback can include indications of specific ones of the items that are selected from the item inventory for a client 142 by the one of the entities 132 that is tasked with selecting items from the item inventory for the client 142. In accordance with specific embodiments, the coverage feedback and/or the selection feedback can be used to modify one or more feature selection process(es) to improve the performance of the overall recommendation system 102.

After items are provided (e.g., mailed, shipped, sent, transmitted or otherwise provided) to clients 142, each client determines what items they will keep or otherwise accept and which items they will return or otherwise reject (i.e., not accept). In certain embodiments, a client may need to pay for (i.e., purchase) the items that they accept, but need not pay for the items that they do not accept. Where items are shipped to clients, the clients keep the items that they accept and pay for, and the clients return the items they do not accept and do not pay for. Information about which items particular clients accept and which items particular clients reject (i.e., do not accept) is also shown as being provided to the feedback interface, which information can be referred to as client feedback. More generally, client feedback data can include information obtained explicitly or implicitly from a client about one or more of the items provided to a client 142 after the item(s) were selected from the item inventory for the client 142 by the one of the entities 132 that is tasked with selecting items from the item inventory for the client 142. The client feedback can be entered by a client and/or can be entered by some other entity, e.g., an entity that is responsible with tracking returned or otherwise unaccepted items. Other variations are also possible. For example, a client may provide explicit subjective feedback that specifies to what extent they were satisfied and/or not satisfied with particular items provided to them. Additionally, or alternatively, in certain embodiments clients can be asked to respond to survey questions, with answers to such question being another example of explicit subjective client feedback. More generally, a system (e.g., 102) can prompt a client (e.g., 142) to provide explicit subjective feedback for various different attributes associated with items selected for and provided to the client. Other types of client feedback can be considered implicit, in that it is based on one or more actions made by a client, e.g., whether or not a client accepted or returned (and thus rejected) an item. Client feedback may be both explicit and implicit, meaning both types of client feedback may be obtained. In accordance with certain embodiments, client feedback is saved as client history data in the client database 122-1.

The feedback interface 152 can provide the feedback it receives, or information indicate thereof, to the processor(s) 112. More generally, the processor(s) 112 have access to feedback received by the feedback interface 152 either directly from the feedback interface 152 or by accessing the data store(s) where the feedback has been saved. In accordance with certain embodiments, the processor(s) 112 obtain client feedback information (e.g., from the feedback interface 152) and employs adaptive machine learning to update or otherwise modify (in dependence on the client feedback information) the client information and/or the item information stored in the databases 122-2 and/or 122-3. For example, a client, via a user interface, may have initially indicated that they like apparel having a glamorous style, and dislike apparel having a casual style. However, despite the client's own opinion of their style preferences, the client may consistently purchase or otherwise accept apparel sent to them having a casual style, and consistently return or otherwise reject apparel sent to them having a classic style. In such a case, the client may have unintentionally mischaracterized their actual style preferences. Through such client feedback received by the feedback interface 152, the processor(s) 112 may modify information stored within the client database 122-2 that specifies the style preferences of a client. For another example, if an item indicated as being "good for tall" women is repeatedly not accepted by tall women, but is repeated accepted by average height women, then the processor(s) 112 may modify one or more attributes of that item so that the item is no longer associated with the attribute "good for tall", but rather, has the attribute "good for average height". The client information that is updated or otherwise modified based on client feedback can be client history information, which may be indicative which items were purchased or otherwise accepted by the client, which items were returned or otherwise not accepted by the client, how much a client has actually spent on specific types of items, and/or the like. These are just some examples of the types of client history data that may be updated base on client feedback, which examples are not intended to be all encompassing.

As mentioned above, the processor(s) 112 can calculate one or more metrics that quantify one or more aspects of a subset of items. Exemplary metrics that quantify aspects of a subset of items include, but are not limit to, a metric indicative of probability of successfully (for making a sale), a metric indicative of profit, a metric indicative of similarity to previous items accepted by a client, a metric indicative of dissimilarity to previous items accepted by a client and/or the like. Such metrics can be determined, using metric processes, in dependence on client information stored in the client database 122-1 and/or item information stored in the inventory database 122-2. In accordance with an embodiment, the processor(s) 112 can modify, in dependence on the client feedback, how one or more such metrics are calculated.

Attributes specified based on human judgment, by a client and/or expert-human, can be fallible, in contrast to empirical data. In accordance with specific embodiments, attributes specified by a human can be adjusted as empirical data is collected using the feedback interface 152. For example, a client may specify that they are "very" preppy, yet their purchase behavior may suggest that they are not preppy, but rather are very classic. The client attribute information, entered or otherwise specified by the client, can represent a prior value indicative of a client's preference. Stored information specifying the client's preferences can be modified over time as more and more empirical data is collected. For example, initially client specified attributes can be weighted very highly, and thereafter, as more empirical data is collected the client specified attributes can be weighted less and less, and the empirical data can be weighted more and more. Similar adjustments can be made to item attributes initially specified by human experts.

In accordance with certain embodiments, the processor(s) 112 modify one or more feature selection process(es) that is/are stored in the database 122-4, based on the updated stored client history data, in order to improve performance of the overall system 102. As noted above, the feature selection process(es) is/are used to select features (also referred to as attributes) that are presented to the entities 132 that are tasked with selecting items from the item inventory for the clients 142. This may include not only which attributes of recommended items are selected for presentation to an entity 132 tasked with selecting items for a client 142, but also "where" item attributes are displayed (e.g., such as in the top left corner, the top right corner, the bottom left corner, the bottom right corner, the top center, the bottom center, along a left side, along a right side, etc.) and "how" item attributes are displayed (e.g., such as the size of images that are displayed, the color and/or font size of text that is displayed, etc.). Similarly, this may include not only which attributes of the client 142 are selected for presentation to the entity 132 tasked with selecting items for a client 142, but also "where" client attributes are displayed (e.g., such as in the top left corner, the top right corner, the bottom left corner, the bottom right corner, the top center, the bottom center, along a left side, along a right side, etc.) and "how" item attributes are displayed (e.g., such as the size of images that are displayed, the color and/or font size of text that is displayed, etc.). More generally, in accordance with certain embodiments, one or more feature selection process(es) can be modified based on client history data, client feedback, selection feedback and/or coverage feedback, in order to improve performance of the system 102. System performance can be a measure of sales, client satisfaction, client retention, profitability, or combinations thereof, but is not limited thereto.

Figure 3:
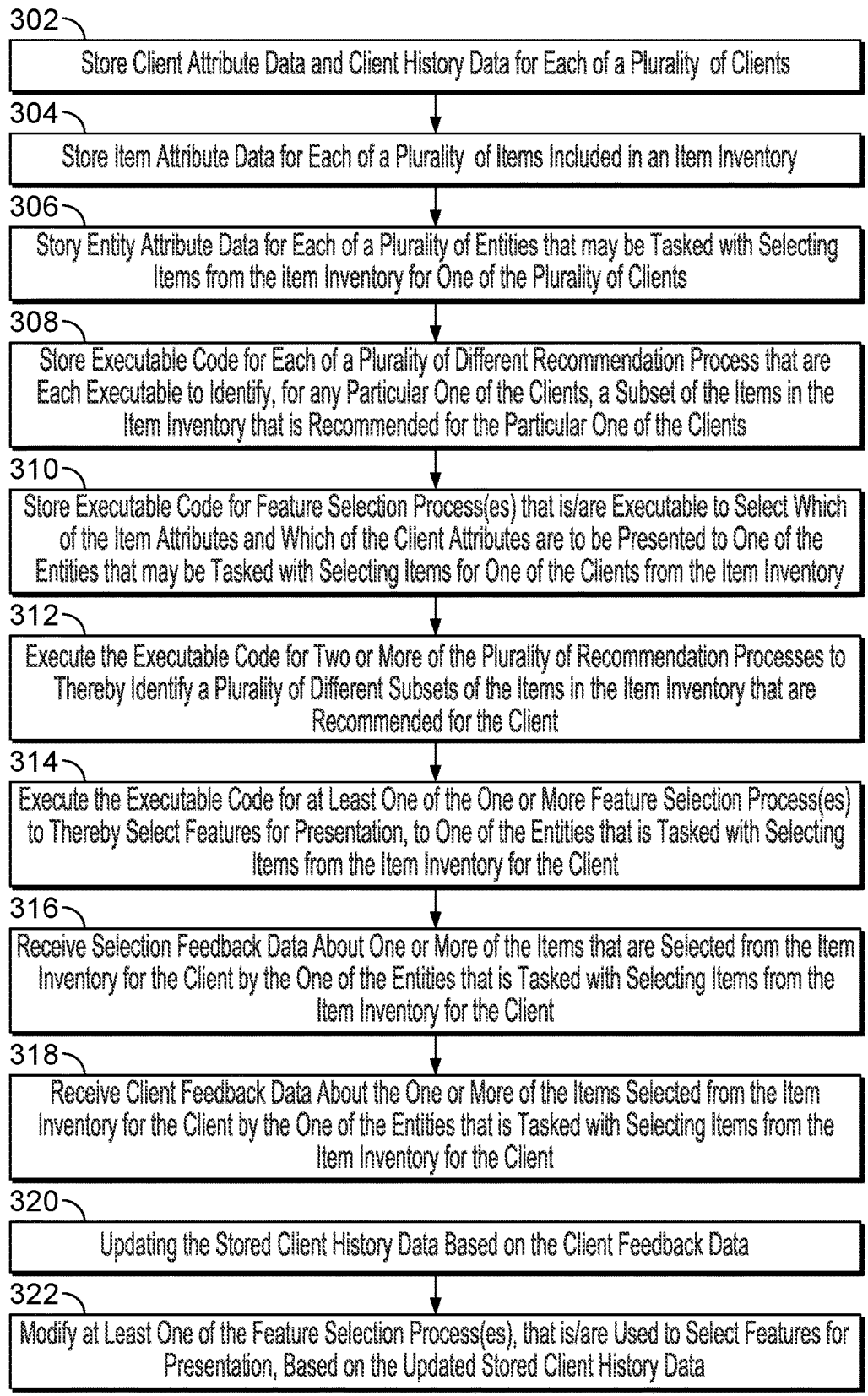
FIG. 3 is a high level flow diagram used to summarize methods, according to embodiments of the present technology, for improving the performance of a recommendation system.

The high level flow diagram of FIG. 3 will now be used to summarize methods according to various embodiments of the present technology. Such methods provide a mechanism to improve the performance of a system that utilizes a combine machine-learning processes with expert-human judgment to select items from an item inventor for clients. Referring to FIG. 3, step 302 involves storing client attribute data and client history data for each of a plurality of clients. Such client attribute data and client history data can be stored, for example, in the client database 122-1 discussed above with reference to FIG. 1. Step 304 involves storing item attribute data for each of a plurality of items included in an item inventory. Such item attribute data can be stored, for example, in the inventory database 122-2 discussed above with reference to FIG. 1. Step 306 involves storing entity attribute data for each of a plurality of entities that may be tasked with selecting items from the item inventory for one the plurality of clients. Such entity attribute data can be stored, for example, in the entity database 122-3 discussed above with reference to FIG. 1. Step 308 involves storing executable code for each of a plurality of different recommendation processes that are each executable to identify, for any particular one of the clients, a subset of the items in the item inventory that is recommended for the particular one of the clients. Step 310 involves storing executable code for one or more feature selection process(es) that is/are executable to select which of the item attributes and which of the client attributes are to be presented to one of the entities the may be tasked with selecting items for one of the clients from the item inventory. The executable code stored at steps 308 and 310 may be stored, for example, in the recommendation and feature selection process database 122-4 discussed above with reference to FIG. 1. Additional details of the data and executable code stored at steps 302, 304, 306, 308 and 310 were described above with reference to FIG. 1, and thus, need not be repeated. The data and executable code stored at steps 302, 304, 306, 308 and 310 can alternatively be stored in more or less databases than described (and shown in FIG. 1) and/or in other types of data stores.

Still referring to FIG. 3, steps 312 and 314, which can be performed by one or more processors (e.g., 112 in FIG. 1), are performed for each client of two or more of the clients. Step 312 involves executing the executable code for two or more of the plurality of recommendation processes to thereby identify a plurality of different subsets of the items in the item inventory that are recommended for the client. Step 314 involves executing the executable code for at least one of the one or more feature selection process(es) to thereby select features for presentation (e.g., display), to one of the entities that is tasked with selecting items from the item inventory for the client. In accordance with specific embodiments, the selected features include information about two or more item attributes (associated with items includes in two or more of the plurality of different subsets of the items in the inventory that are identified as a result of the executable code for two or more of the plurality of recommendation processes being executed), and information about two or more of the client attributes (associated with the client). Details of various types of recommendation processes and feature selection process(es) were described above with reference to FIGS. 1 and 2, and thus, need not be repeated.

Still referring to FIG. 3, steps 316 and 318, which can be performed by a feedback interface (e.g., 152 in FIG. 1), are performed for each client of the two or more of the clients. Step 316 involves receiving selection feedback data about one or more of the items that are selected from the item inventory for the client by the one of the entities that is tasked with selecting items from the item inventory for the client. Step 318 involves receiving client feedback data about the one or more of the items selected from the item inventory for the client by the one of the entities that is tasked with selecting items from the item inventory for the client. In other words, at step 316 information about what items were selected by an entity 132 for a client 142 can be obtained, and at step 318, information about whether the client 142 accepted or rejection the items selected and provided to them can be obtained. Further types of information can be obtained at steps 316 and 318. Details of various types of feedback that can be received, e.g., by the feedback interface 152 in FIG. 1, were described above with reference to FIGS. 1 and 2, and thus, need not be repeated. In between steps 316 and 318, items selected for a client 142 by an entity 132 are provided to the client 142, at which point the client decides which item(s), if any, they accept, and which item(s), if any, they do not accept.

Still referring to FIG. 3, step 320 involves updating the stored client history data based the client feedback data. Step 322 involves modifying at least one of the one or more feature selection process(es), that is/are used to select features for presentation, based on the updated stored client history data. In accordance with certain embodiments, step 322 includes modifying which attributes of recommended items are selected for presentation to an entity 132 tasked with selecting items for a client 142. Additionally, or alternatively, step 322 can include modifying "where" item attributes are displayed (e.g., such as in the top left corner, the top right corner, the bottom left corner, the bottom right corner, the top center, the bottom center, along a left side, along a right side, etc.). Additionally, or alternatively, step 322 can include modifying "how" item attributes are displayed (e.g., such as the size of images that are displayed, the color and/or font size of text that is displayed, etc.).

In accordance with certain embodiments, step 322 includes modifying which, where and/or how attributes of a client (which can also be referred to as client attributes) are presented (e.g., displayed) to an entity 132 tasked with selecting items for a client 142. Exemplary client attributes that may be presented to an entity 132 that is tasked with selecting items for a client 142, include: date of birth and/or age, height, weight, waist size, chest size, bra size, inseam length, torso length, shirt size, dress size, pant size, residential address, whether or not the client is a mother, occupation, and/or the like, a picture of the client, the client's preferred style (e.g., classic, preppy, casual, bohemian, etc.), preferred fit (e.g., loose, fitted, tight, etc.), the client's preferred color scheme (e.g., bright, subdued), the client's preferred patterns (e.g., solids, stripes, floral), the client's preferred and/or disliked colors, the client's body type (e.g., straight, pear, spoon, hourglass, top hourglass, inverted triangle, oval, diamond, etc.), how long the particular client has been a member of the recommendation service provided by the system 102, how often items have been shipped to the client, which items were purchased or otherwise accepted by the client, which items were returned or otherwise not accepted by the client, how much a client has actually spent on specific types of items, and/or the like.

Certain embodiments of the present technology can be used to determine which client attributes, when presented to an entity 132 tasked with selecting items for a client 142, improve system performance or diminish system performance. For example, such embodiments can be used to determine whether displaying a picture of the client 142, to the entity 132 tasked with selecting items for the client 142, results in the entity 132 selecting items that are more to the client's liking, or less to the client's liking. For another example, such embodiments can be used to determine whether displaying the age of the client 142, to the entity 132 tasked with selecting items for the client 142, results in the entity 132 selecting items that are more to the client's liking, or less to the client's liking. Determinations of whether an item is more or less to a client's liking can be based in client feedback, including, but not limited to, whether or not the client accepted or rejected the items, and/or answers to questions presented to the client about items provided to the client. More generally, such embodiments can be used to determine which client attributes when presented, improve system performance, and which client attributes when presented, diminish system performance. Such embodiments can additionally, or alternatively, be used to determine whether certain modifications to where and/or how client attributes are presented, improve system performance or diminish system performance.

In accordance with certain embodiments, step 322 includes modifying which, where and/or how item attributes are presented to an entity 132 tasked with selecting items for a client 142. Exemplary item attributes that may be selected for presentation to an entity 132 tasked with selecting items for a client 142, include: item type (e.g., pant, skirt, dress, etc.), item designer and/or brand, item size, item color, item SKU number, item pattern (e.g., solid, checked, pinstripe, etc.), item material (e.g., cotton, wool, synthetic, etc.), good for tall women, good for short women, good for busty women, good for women in the State of Texas, good for preppy women, good for women in their 20s, good for women in their 50s, good for women with a long torso, casual, dressy, good for tropical vacations, good for spring, good for winter, fits true to size, runs small, runs large, good for women with a specific body type (e.g., straight, pear, spoon, hourglass, top hourglass, inverted triangle, oval, diamond, etc.), item sale price, item profit margin (if purchased by a client), how many units of an item are presently in the item inventory, how often an item has been accepted (e.g., purchased) by clients, how often an item once provided to clients has been accepted (e.g., purchased) by clients, and/or the like.

Certain embodiments of the present technology can be used to determine which item attributes, when presented to an entity 132 tasked with selecting items for a client 142, improve system performance or diminish system performance. For example, such embodiments can be used to determine whether displaying an item designer and/or brand, to the entity 132 tasked with selecting items for the client 142, results in the entity 132 selecting items that are more to the client's liking, or less to the client's liking. For another example, such embodiments can be used to determine whether displaying that an item is dressy or casual, to the entity 132 tasked with selecting items for the client 142, results in the entity 132 selecting items that are more to the client's liking, or less to the client's liking. As noted above, determinations of whether an item is more or less to a client's liking can be based in client feedback, including, but not limited to, whether or not the client accepted or rejected the items, and/or answers to questions presented to the client about items provided to the client. More generally, such embodiments can be used to determine which item attributes when presented, improve system performance, and which item attributes when presented, diminish system performance. Such embodiments can additionally, or alternatively, be used to determine whether certain modifications to where and/or how item attributes are presented, improve system performance or diminish system performance.

Figure 4:
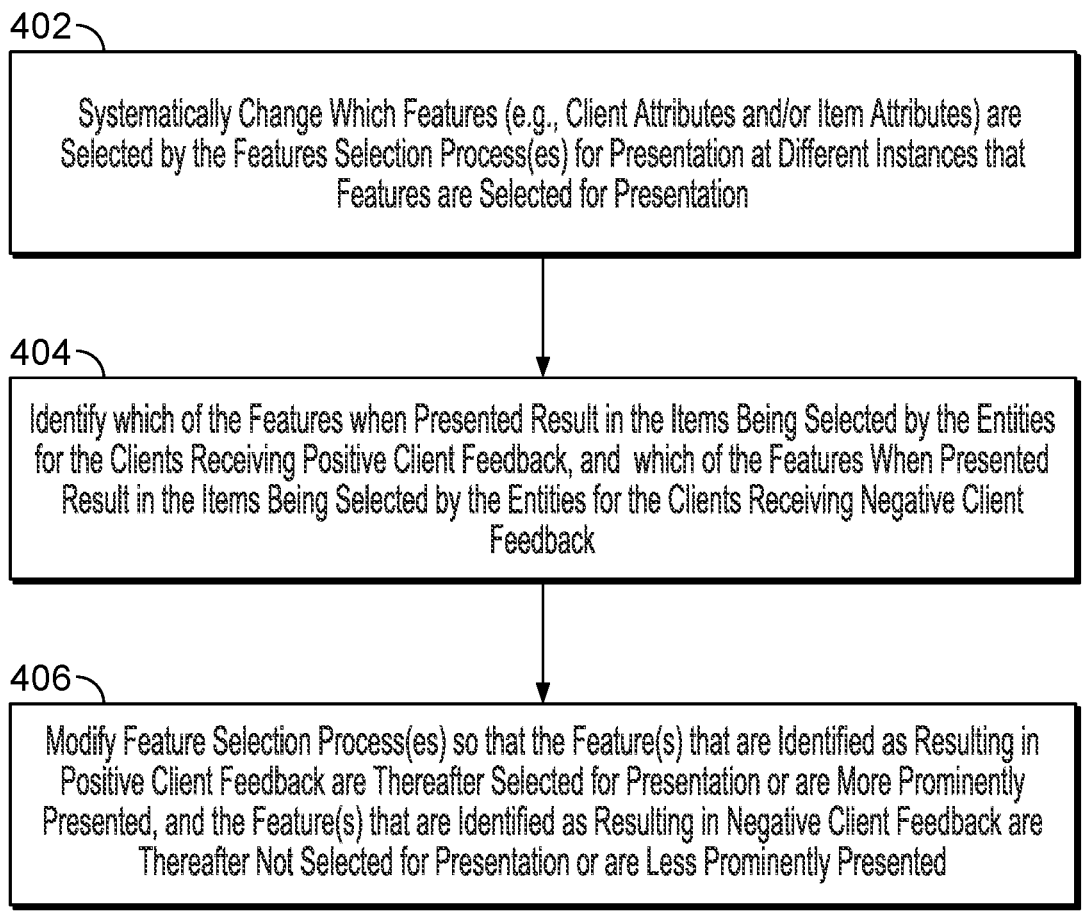
FIG. 4 is a high level flow diagram that provides exemplary details as to how one or more feature selection process(es) can be modified to improve the performance of a recommendation system, in accordance with specific embodiments of the present technology.

Details of how the feature selection process(es), stored in the database 122-4, may be modified in accordance with certain embodiments, will now be described with reference to the flow diagram of FIG. 4. Referring to FIG. 4, step 402 involves systematically changing which features (e.g., client attributes and/or item attributes) are selected by the features selection process(es) for presentation at different instances that features are selected for presentation. Step 404 involves identifying which of the features when presented result in the items being selected by the entities for the clients receiving positive client feedback, and which of the features when presented result in the items being selected by the entities for the clients receiving negative client feedback. Step 406 involves modifying at least one of the one or more feature selection process(es) so that one or more of the features that are identified as resulting in positive client feedback are thereafter selected for presentation or are more prominently presented, and one or more of the features that are identified as resulting in negative client feedback are thereafter not selected for presentation or are less prominently presented. If a client accepts an item, that can be interpreted as positive client feedback, and if a client does not accept an item, that can be interpreted as negative client feedback. Client feedback may also be obtained based on a client's responses to questions presented to the client. Other variations are also possible, and within the scope of the embodiments described herein.

The steps described with reference to FIG. 4 can be performed over time as various entities 132 select items that are actually provided to clients 142. Alternatively, or additionally, the steps described with reference to FIG. 4 can be performed as part of simulations that use previously obtained client history data to simulate whether certain modifications to feature selection process(es) will improve system performance or diminish system performance. For example, where sufficient client history data is stored for a number of clients 142, simulations can be used to test whether showing pictures of the clients 142, to entities 132 that may be tasked with selecting items for the clients 142 (during the simulations), help or hinder the entities 132 in selecting items that the clients 142 will like and accept. For another example, where sufficient client history data is stored for a number of clients 142, simulations can be used to test whether displaying the clients' age, to entities 132 that may be tasked with selecting items for the clients 142 (during the simulations), help or hinder the entities 132 in selecting items that the clients 142 will like and accept. For still another example, where sufficient client history data is stored for a number of clients 142, simulations can be used to test various different locations where certain client data may be displayed to entities 132, to see which location results in the entities 132 making the best selections for the clients 142. The simulations can also be used to test out different locations (where) and/or ways (how) that item attributes and/or client attributes may be displayed to entities that may be tasked with selecting items for the clients. Referring back to FIG. 1, such simulations can be performed, e.g., using a training interface 162. The training interface 162 can be used to train the feature selection process(es), as well as to train the actual entities 132 that may be tasked with selecting items from an item inventory for clients 142. The training interface 162 can be accesses using a web browser, or can be implemented using custom software. Entities 132 that use the training interface 162 may be presented with information similar to what is shown in FIG. 2. The types of client attribute data and/or item attribute data that are displayed, as well as where and/or how different client attribute data and/or item attribute data is displayed, can be systematically changed to determine what improves, and preferably optimizes, over system performance.

The embodiments of the present technology described above with reference to FIGS. 1-4 can be used to intelligently, and in some instances systematically, analyze big data related to clients and item inventory, and select which subsets of data should be presented to provide for good overall system performance. Such embodiments utilize coverage feedback, selection feedback and/or client feedback to improve the overall system performance over time. Accordingly, such embodiments of the present technology address and at least partially overcome big data problem related to the visualization of big data that includes client data and item inventory data.

Referring back to FIG. 1, in accordance with certain embodiments, the processor(s) 112 can access client history data to produce training tasks for the entities 132 that may be tasked with selecting items for the clients 142 from the item inventory, and the training tasks can be presented to at least some of the entities 132 for the purpose of training the entities 132 and/or training one or more feature selection process(es). During such training, which can also be referred to as simulations, training feedback can be provided to the entities 132 to tell them whether the items they selected would, or would not have been, accepted by certain clients, and in certain instances, why. For example, the training feedback can provide indications, based on the client history data, regarding whether particular ones of the clients 142, for which the entities 132 selected items from the item inventory in response to the training tasks, had provided positive or negative feedback regarding the items. Such embodiments can be used to train new entities 132, train poorly performing entities 132, or provide training to entities 132 that may in the future be matched with different types of clients 142 than they had previously worked with. In accordance with certain embodiments, the entity attribute data stored in the database 122-3 can include training history data indicative of types of training provided to specific entities 132 and/or the efficacy of the training provided to specific entities 132. Such training history information can be used, e.g., to assist in assigning tasks to the entities 132, wherein such tasks relate to selecting items from the item inventory for one of the clients. Such assignments can be performed, e.g., using a task assignment process. More specifically, executable code for a task assignment process can be stored in a data store, e.g., in the database 122-4, and the processor(s) 112 can executed the code for the task assignment process in order to assign tasks to entities 132.

Certain embodiments of the present technology, described herein, were conceived from the need to measure, train, and understand the human contribution to a recommendation system. While the development, training, testing, and optimization of traditional recommendation systems may be a well-established process, best methods for working humans into that loop have not yet been specified. That said, humans can improve recommendation systems by dealing with the types of data that computers currently struggle with (e.g., images, text or other unstructured data). Certain embodiments of the present technology described herein provide a platform to study the human contribution to the broader recommendation system, and then optimize their performance to create a better overall recommendation system.

Traditionally, recommendation systems were developed by giving an algorithm a subset of training data, allowing it to make predictions after being trained, checking the outcomes of those recommendations, then feeding those outcomes back into the system to allow it to learn. Where humans (i.e., the entities 132) are part of a recommendation system, they can be trained in a similar way. To the point, the entities 132 may receive a long list of recommendations produced using computer implemented recommendation processes, and they are shown a similar feature set about a given client, and are then asked to curate a short list of recommendations that are ultimately provided (e.g., sent) to the client. Embodiments of the present technology described herein provides for an understanding as to how the entities 132 go about making that short list, and then alters their behavior when needed in order to improve their performance, and therefore the performance of the overall recommendation system 102.

As described in additional detail above, embodiments described herein can be used to determine both what information the entities 132 use and how they make decisions based on it. This is important for understanding the current configuration of the human component to the recommendation system 102, including which features the humans are using in order to make their decisions. It can be thought of analogously to feature selection in algorithm development. For an example, embodiments of the present technology can be used to examine how the entities 132 use a set of displayed 'style scores' to select items for clients 142. More specifically, such embodiments have been used to find that the entities 132 performed best (i.e., were most accurate) when given two sets of these scores (one for a client and one for the item they were considering for that client). It is now believed that the entities 132 likely compare the two sets of values to create a proxy for "similarity" between client and item. It is important to note that this was not user interface (UI) testing. Rather, the study showed that the entities 132 consider the information in the scores to making fast, on-the-fly calculations between those scores which increased their accuracy.

Using embodiments of the present technology, after studying a given behavior and drawing conclusions about what causes "better" outcomes, these same behaviors can be encouraged, thereby optimizing skills of the entities 132. Thus, embodiments described herein can also be used for training and behavior shaping. For example, during simulations, described above, the information displayed to entities 132 can explicitly mimic some portion of the live recommendation process. Performance feedback can be provided immediately to enforce positive behaviors and discourage negative ones without the normal lag (e.g., two weeks) inherent in providing items to clients and waiting for client feedback. For example, assume it has been previously learned that understanding how items fit different body types is crucial for making good recommendations. Based on this, a series of questions can be created showing clients 142 with varying body types and asked entities 132 whether a given garment would "fit" the client 142 or not. By using historical client data to create the questions, this allows the system to provide the entities 132 being trained with the correct responses after they tried to answer each question, and also enables the system to provide the entities 132 with concept relevant feedback given by that client 142 immediately after the entity 132 answers a question.

Embodiments of the present technology can also be used to monitor the performance of the entities 132, and to create highly rigorous experiments which control variables, and directly measure abilities, thereby allowing their skills and weaknesses to be understood, and reactions in a more direct sense.

Logging all behaviors of the entities 132 when they are actually performing tasks could be costly with regards to data storage. For example, it might be possible to log all mouse movements, clicks, and scrolls for all task related events, but this could require massive data stores and heavy processing. Certain embodiments described herein allow for the collecting every type of data that is possible, but only as required. Embodiments described herein can also allow for an interface with other research technologies, such as eye trackers, to measure psychophysical variables that could be difficult to interface with accurately in a normal environment. This data can then be used to create questions/trials for better understanding current behaviors of the entities 132, and then for creating recommendation training programs.

As mentioned above, there are well known techniques to train, test and tune computer implemented recommendation processes that are known to be effective. Embodiments of the present technology described herein expands applications of such techniques to human entities. For example, embodiments described herein can be used to highlight information that is useful to the entities 132, and remove extraneous information that might overload or slow down the entities 132.

Embodiments of the present technology described herein can be used to provide highly targeted and personalized training regimens to improve the entities 132 long term contribution to the system 102, thereby allowing the system 102 to improve its performance over time.

In many of the examples described above, the items in the item inventory were described as being women's apparel, and the systems and methods were described as employing adaptive machine learning to recommend subsets of women's apparel to an entity that selects one or more pieces of women's apparel to send or otherwise provide to a client. However, embodiments of the present technology are not limited to such types of items, and more generally, can be used for recommending almost any type of item that would benefit from combining machine-learning processes with expert-human judgment. For example, the items in the item inventory can alternatively be men's apparel, food, wine, beer, artwork, music or movies, just to name a few. Depending upon the type of items, certain types of items that are selected for a client can be provided to a client by delivering, mailing or shipping the items to the client, while other types of items can be delivered electronically over wired or wireless communication networks. Preferably, the entity that is tasked with selecting items for a client, based on recommendations generated using one or more computers, has an acceptable level of expertise in the type of items included in the item inventory. For example, where the items are women's apparel, the entity that select which items to be sent to a client may have studied fashion, worked in fashion, and/or worked in clothing retail. For another example, where the items are wine, the entity that selects which items are to be sent to a client may be a sommelier, a wine collector or have worked for a vineyard. These are just a few examples that are not intended to be all encompassing.

The items in an item inventory need not be physical products. For example, the items in an item inventory can alternatively be insurance policies. In other words, embodiments of the present technology can be used to select insurance policies for clients. For another example, the items in an item inventory can be travel packages, in which case embodiments of the present technology can be used to select travel packages for clients. It is also possible that the items in an item inventory are applicants for a job, in which case, embodiments of the present technology can be used to help sift through resumes, or the like, to select specific prospective hires for clients. For still another example, the items in an item inventory can be student applicants, in which case, embodiments of the present technology can be used to help sift through school applications to select which student applicants should be accepted to a school. These are just a few examples, which are not intended to be all encompassing. More generally, embodiments described herein are especially useful for providing recommendations in domains where: (1) there are numerous choices available to select from for a client; (2) the products or services (or more generally, the items) need to be personalized for a client; (3) there exists both structured and unstructured data about the items and/or clients, which would benefit from a combination of machine-learning processes and expert-human judgment (e.g., so machines can handle the structured data, and expert-humans can handle the unstructured data); and (4) a client is given an opportunity to try selected items and provide feedback regarding what they like and don't like about the items they tried. As noted above, the types of recommendation processes and the themes associated therewith can vary greatly, depending upon the types of items in an item inventory and the clients for which items are being selected.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a cathode ray tube (CRT) or liquid crystal display (LCD) monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:

1. A system, comprising:
one or more data stores configured to store:
client attribute data that includes a plurality of client attributes and client history data, for each of a plurality of clients, wherein the plurality of client attributes include one or more client specified attributes; and
item attribute data that includes a plurality of item attributes, for each of a plurality of items included in an item inventory;
one or more processors coupled to the one or more data stores and configured to:
select, using one or more feature selection processes, from the plurality of item attributes an item attribute and from the plurality of client attributes a client specified attribute associated with a client, wherein the selected item attribute and the selected client specified attribute are selected for presentation to an entity tasked with selecting one or more items for the client;
select a subset of a plurality of different recommendation processes to use for the client;
identify a plurality of different subsets of the items in the item inventory that are recommended for the client using the subset of the plurality of different recommendation processes, wherein the subset of the plurality of different recommendation processes implements a machine learning technique;
provide to the entity tasked with selecting one or more items for the client the plurality of different subsets of items in the item inventory that are recommended for the client;
receive selection feedback from the entity tasked with selecting one or more items for the client and a selection feedback from the client, wherein the client selection feedback indicates one or more items selected by the client among the one or more items that were selected by the entity, wherein the client selection feedback is used to update the client history data; and
modify the one or more feature selection processes based on the client selection feedback, wherein a manner in which the one or more feature selection processes select item attributes and client attributes to select items for the client are modified based on the client selection feedback including by modifying a corresponding weight associated with the selected client specified attribute based on the client selection feedback.

2. The system of claim 1, wherein the one or more processors are further configured to:
systematically change which features are selected by a feature selection process for presentation at different instances that features are selected for presentation;
identify which of the features when presented result in the items being selected by one or more entities for clients receiving positive client feedback, and which of the features when presented result in the items being selected by the one or more entities for the clients receiving negative client feedback; and
modify the feature selection process so that one or more of the features that are identified as resulting in positive client feedback are thereafter selected for presentation or are more prominently presented, and one or more of the features that are identified as resulting in negative client feedback are thereafter not selected for presentation or are less prominently presented.

3. The system of claim 1, wherein each of the different recommendation processes utilize the client attribute data, the client history data and/or the item attribute data in a different manner than other recommendation processes of the plurality of different recommendation processes.

4. The system of claim 1, wherein a modification of the one or more feature selection processes, based on the updated client history data, results in information about item attributes that are selected for presentation being modified to thereby improve performance of the system.

5. The system of claim 1, wherein a modification of the one or more feature selection processes, based on the updated client history data, results in information about client attributes that are selected for presentation being modified to thereby improve performance of the system.

6. The system of claim 1, wherein the one or more processors are further configured to:
access the client history data to produce training tasks for one or more entities that are tasked with selecting items for the clients from the item inventory;
present at least some of the training tasks to at least some of the one or more entities that are tasked with selecting items for the clients from the item inventory; and
provide training feedback to the one or more entities that are presented with at least some of the training tasks.

7. The system of claim 6, wherein the training feedback provides indications, which are based on the client history data, regarding whether particular ones of the clients, for which the one or more entities selected items from the item inventory in response to the training tasks, had provided positive or negative feedback regarding the selected items.

8. The system of claim 6, wherein:
the one or more data stores are further configured to store:
entity attribute data, for each of the one or more entities that are tasked with selecting items from the item inventory for one or more of the clients, the entity attribute data for each entity of at least some of the one or more entities including training history data indicative of at least one of types of training provided to the entity or efficacy of the training provided to the entity; and
a task assignment process that is executable by the one or more processors to assign at least some tasks to at least some of the entities based on the training data stored for the one or more entities, each of the tasks relating to selecting items from the item inventory for one of the clients.

9. The system of claim 8, wherein the one or more processors function as a task assignment server when executing the task assignment process.

10. The system of claim 1, wherein the one or more processors are configured to perform simulations based on the client history data and modify at least one of which, where, or how client attributes or item attributes are displayed based on results of the simulations.

11. A method, comprising:
selecting, by one or more processors, using one or more feature selection processes, an item attribute from a plurality of item attributes and a client specified attribute associated with a client from a plurality of client attributes, wherein the selected item attribute and the selected client specified attribute are selected for presentation to an entity tasked with selecting one or more items for the client, wherein the one or more processors are coupled to a one or more data stores, wherein the one or more data stores are configured to store:
client attribute data that includes the plurality of client attributes and client history data, for each of a plurality of clients; and
item attribute data that includes a plurality of item attributes, for each of a plurality of items included in an item inventory, wherein the client attribute data includes the selected client attribute and the item attribute data includes the selected item attribute;
selecting, by the one or more processors, a subset of a plurality of different recommendation processes to use for the client;
identifying a plurality of different subsets of the items in the item inventory that are recommended for the client using the subset of the plurality of different recommendation processes, wherein the subset of the plurality of different recommendation processes implements a machine learning technique;
providing to the entity tasked with selecting one or more items for the client the plurality of different subsets of items in the item inventory that are recommended for the client;
receiving selection feedback from the entity tasked with selecting one or more items for the client and a selection feedback from the client, wherein the client selection feedback indicates one or more items selected by the client among the one or more items that were selected by the entity, wherein the client selection feedback is used to update the client history data; and
modifying the one or more feature selection processes based on the client selection feedback, wherein a manner in which the one or more feature selection processes select item attributes and client attributes to select items for the client are modified based on the client selection feedback including by modifying a corresponding weight associated with the selected client specified attribute based on the client selection feedback.

12. The method of claim 11, further comprising:
systematically changing which features are selected by a feature selection process for presentation at different instances that features are selected for presentation;
identifying which of the features when presented result in the items being selected by one or more entities for the clients receiving positive client feedback, and which of the features when presented result in the items being selected by the entities for the clients receiving negative client feedback; and
modifying at least one of the one or more feature selection processes so that one or more of the features that are identified as resulting in positive client feedback are thereafter selected for presentation or are more prominently presented, and one or more of the features that are identified as resulting in negative client feedback are thereafter not selected for presentation or are less prominently presented.

13. The method of claim 11, wherein each of the different recommendation processes utilize the client attribute data, the client history data and/or the item attribute data in a different manner than other recommendation processes of the plurality of different recommendation processes.

14. The method of claim 11, wherein modifying at least one of the one or more feature selection processes includes modifying information about item attributes that are selected for presentation to thereby improve performance of the method based on updated client history data.

15. The method of claim 11, wherein modifying at least one of the one or more feature selection processes includes modifying information about client attributes that are selected for presentation to thereby improve performance of the method based on updated client history data.

16. The method of claim 11, further comprising:
accessing the client history data to produce training tasks for the one or more entities that are tasked with selecting items for the clients from the item inventory;
presenting at least some of the training tasks to at least some of the one or more entities that are tasked with selecting items for the clients from the item inventory; and
providing training feedback to the one or more entities that are presented with at least some of the training tasks.

17. The method of claim 16, wherein the training feedback provides indications, which are based on the client history data, regarding whether particular ones of the clients, for which one or more the entities selected items from the item inventory in response to the training tasks, had provided positive or negative feedback regarding the items.

18. The method of claim 16, further comprising:
storing entity attribute data, for each of the one or more entities that may be tasked with selecting items from the item inventory for one or more of the clients, the entity attribute data for each entity of at least some of the one or more entities including training history data indicative of at least one of types of training provided to the entity or efficacy of the training provided to the entity; and
assigning at least some tasks to at least some of the one or more entities based on the training data stored for the one or more entities, each of the tasks relating to selecting items from the item inventory for one of the clients.

19. The method of claim 11, wherein the one or more data stores are further configured to store a task assignment process, wherein the one or more processors function as a task assignment server when executing the task assignment process.

20. A computer program product embodied in a non-transitory computer readable medium and comprising computer instructions for:
selecting, by one or more processors, using one or more feature selection processes, an item attribute from a plurality of item attributes and a client specified attribute associated with a client from a plurality of client attributes, wherein the selected item attribute and the selected client specified attribute are selected for presentation to an entity tasked with selecting one or more items for the client, wherein the one or more processors are coupled to a one or more data stores, wherein the one or more data stores are configured to store:
client attribute data that includes the plurality of client attributes and client history data, for each of a plurality of clients; and
item attribute data that includes a plurality of item attributes, for each of a plurality of items included in an item inventory, wherein the client attribute data includes the selected client attribute and the item attribute data includes the selected item attribute;
selecting, by the one or more processors, a subset of a plurality of different recommendation processes to use for the client;
identifying a plurality of different subsets of the items in the item inventory that are recommended for the client using the subset of the plurality of different recommendation processes, wherein the subset of the plurality of different recommendation processes implements a machine learning technique;

providing to the entity tasked with selecting one or more items for the client the plurality of different subsets of items in the item inventory that are recommended for the client;

receiving selection feedback from the entity tasked with selecting one or more items for the client and a selection feedback from the client, wherein the client selection feedback indicates one or more items selected by the client among the one or more items that were selected by the entity, wherein the client selection feedback is used to update the client history data; and modifying the one or more feature selection processes based on the client selection feedback, wherein a manner in which the one or more feature selection processes select item attributes and client attributes to select items for the client are modified based on the client selection feedback including by modifying a corresponding weight associated with the selected client specified attribute based on the client selection feedback.

\* \* \* \* \*